Oct. 17, 1961 W. D. SYMMANK 3,004,392

SUBMARINE PIPE LINE TRENCHER AND METHOD

Filed April 8, 1959 10 Sheets-Sheet 1

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

Oct. 17, 1961 W. D. SYMMANK 3,004,392

SUBMARINE PIPE LINE TRENCHER AND METHOD

Filed April 8, 1959 10 Sheets-Sheet 4

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

Oct. 17, 1961 W. D. SYMMANK 3,004,392

SUBMARINE PIPE LINE TRENCHER AND METHOD

Filed April 8, 1959 10 Sheets-Sheet 6

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

William D. Symmank
INVENTOR.

BY James F. Weiler
Jefferson D. Giller
William A. Stout
ATTORNEYS

United States Patent Office 3,004,392

Patented Oct. 17, 1961

3,004,392

SUBMARINE PIPE LINE TRENCHER AND METHOD

William D. Symmank, Houston, Tex., assignor to Tellepsen Construction Co., Houston, Tex., a corporation of Texas Filed Apr. 8, 1959, Ser. No. 805,063

16 Claims. (Cl. 61—72.4)

Figure 1:
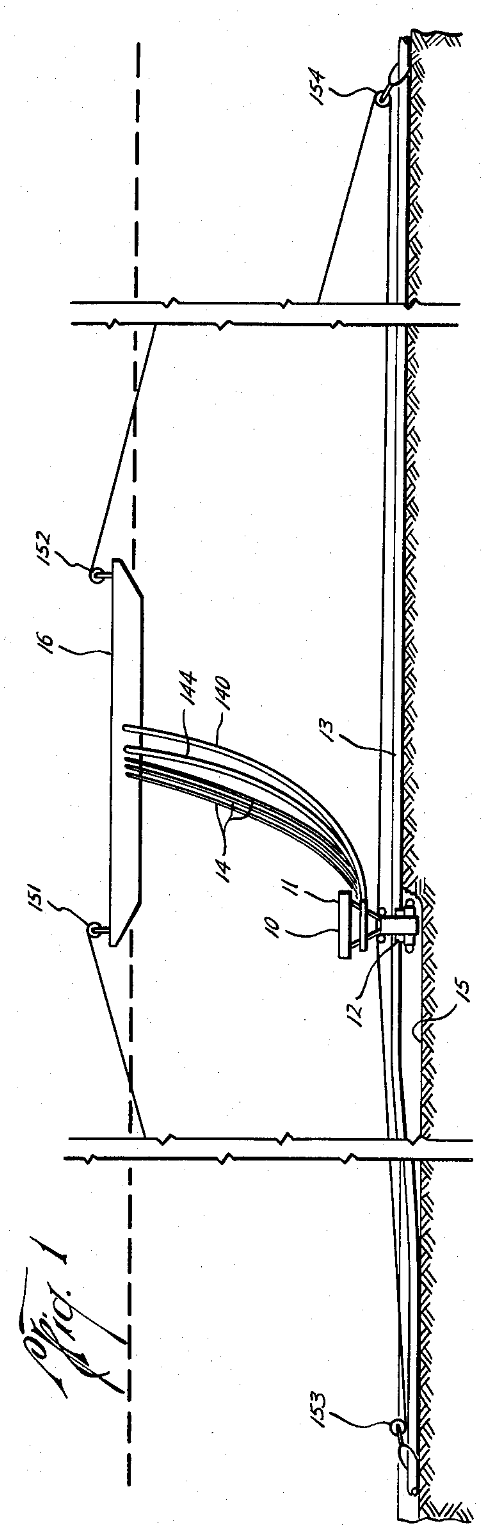

The present invention relates to apparatus for and method of excavating a trench beneath a pipe line at the bottom of a body of water, and, more particularly, relates to such apparatus and method in which a rotary cutting device excavates a trench directly beneath the pipe.

The inevitable crossing of rivers, lakes, ship channels and even extensions out into the ocean by pipe lines has resulted in the practice of laying the pipe on the floor of such bodies of water to provide the necessary protection from surface vessels. It has been found desirable, especially to combat such conditions as oxidation and the attack by marine life on pipe coatings, to more effectively protect the pipe and its coating by providing a trench in the floor in which to completely bury the pipe.

In general, the trenching operations at the present time utilize a high pressure jet apparatus or a plow ditching apparatus. These apparatus have been successful to a certain extent in loose formations or soft formations, but they are not entirely satisfactory for providing deep trenches or trenching through relatively compact formations. Furthermore, the excavated materials from these methods are not effectively removed from the trench so as to prevent them from settling back or falling back into the trench before the pipe has been positioned into the trench. It is to overcome these disadvantages that the present invention is directed.

It is an object of this invention to provide an improved apparatus and method for cutting a trench, removing the excavated cuttings from the trench, and cleaning the excavated trench of cuttings for laying pipe lines at the bottom of bodies of water.

A further object of the present invention is the provision of a submarine pipe line trencher provided with rotary mechanical cutters which effectively cut into compact formations beneath a pipe line.

Yet a further object of the present invention is the provision of an improved apparatus for excavating a trench beneath a pipe line and removing the excavated material out of the trench to a point where it will not settle or fall back into the trench.

A still further object of the present invention is the provision of a submarine pipe line trencher provided with a pincer action so that the trencher may be positioned about or released from the pipe line at any time.

A still further object of the present invention is the provision of a submarine pipe line trencher which is capable of digging relatively deep trenches and disposes of the trench cuttings by suction.

A still further object of the present invention is the provision of an improved submarine pipe line trencher having rotary mechanical cutters and is capable of digging deeply into a formation and is capable of digging its way up and out of a caved-in trench.

Yet a further object of the present invention is the provision of an improved submarine pipe line trencher having rotary mechanical cutters and having high pressure jets which assist the mechanical cutters in cutting the trench, cleaning the trench and keeping the mechanical cutters clean.

Yet a further object of the present invention is the provision of a submarine pipe line trencher which is movable along the pipe line, will not damage the pipe coating, and easily follows the pipe line contour while effectively digging a trench for the pipe line.

Yet a further object of this invention is the provision of a method of excavating a pipe line trench by moving a rotary cutter along and beneath a pipe line, and sucking the excavated material from the trench.

Yet a further object of the present invention is the provision of an improved method of excavating a submarine pipe line trench by moving a plurality of rotary cutters along and beneath a pipe line, removing the cuttings from the trench by suction and jetting the trench and the cutters so as to clean both.

A still further object of this invention is the provision of an improved submarine pipe line trencher in which the cutting or digging elements are actuated hydraulically, as well as other parts thereof, so that hydraulic force from above the surface of the body of water is applied to the various elements of the trencher at the bottom of the body of water to actuate them.

Figure 2:
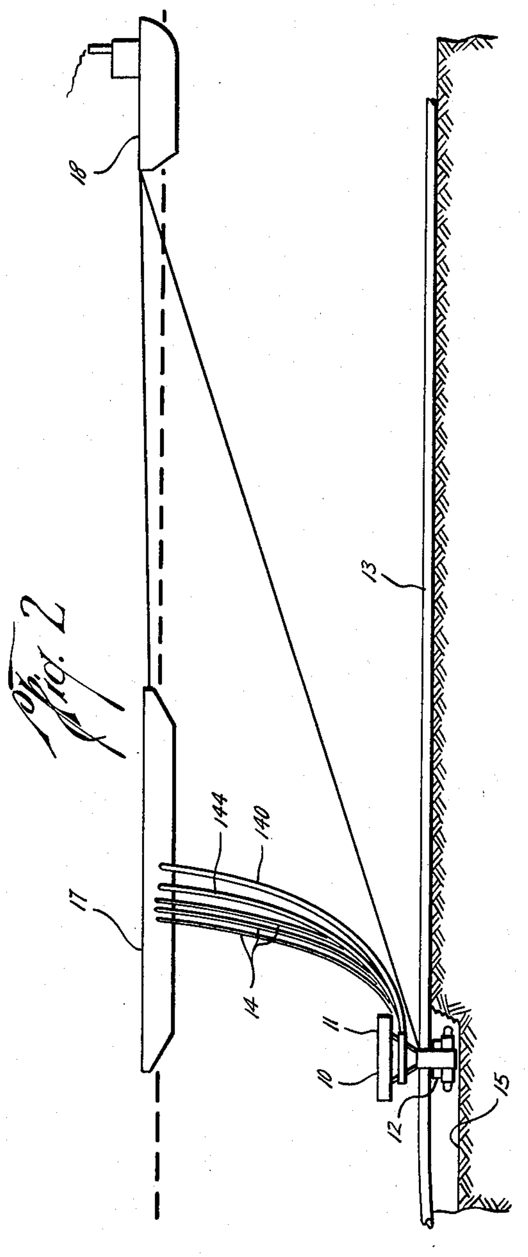

Other and further objects, features and advantages will be apparent from the following description of presently preferred embodiments of the invention, given for the purpose of disclosure, and taken in conjunction with the accompanying drawings, where like character references designate like parts throughout the several views and where, FIGURE 1 is an elevational view illustrating an apparatus according to the invention in operation utilizing a mobile barge containing all of the necessary controls, FIGURE 2 is an elevational view illustrating an apparatus according to the invention in operation utilizing a surface barge and tug arrangement to pull the trencher.

Figure 3:
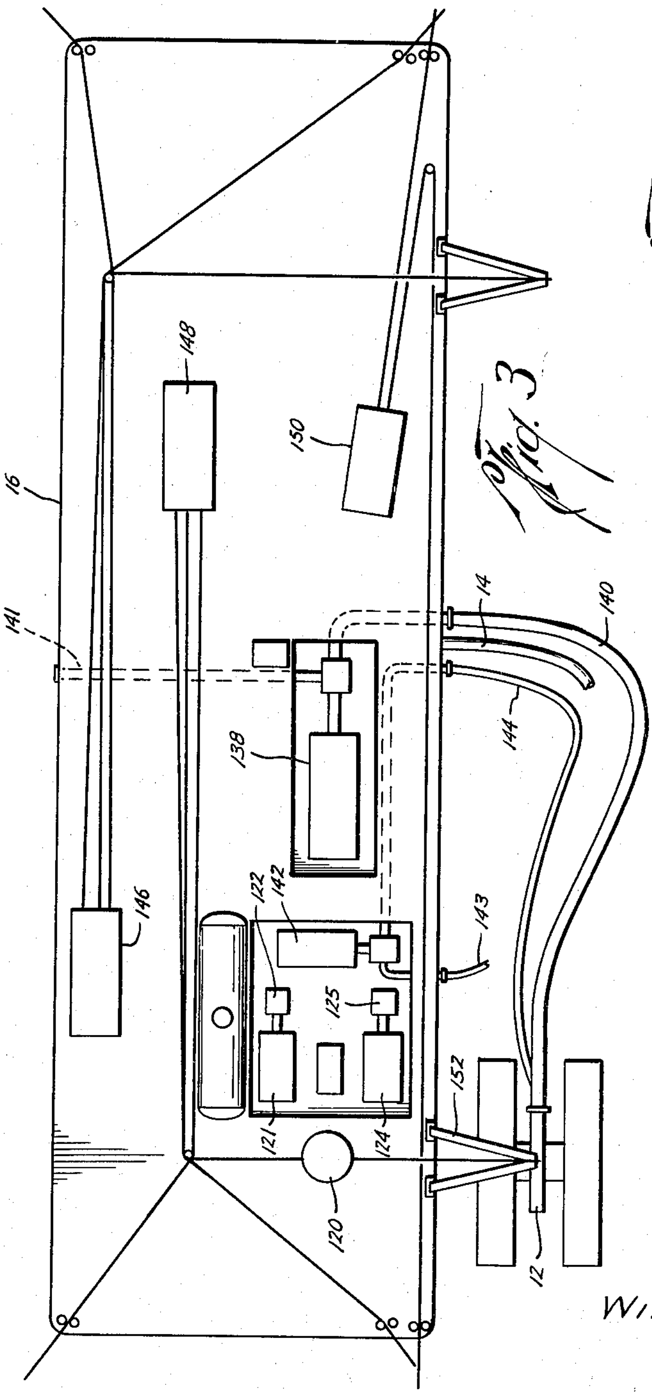
Figure 4:
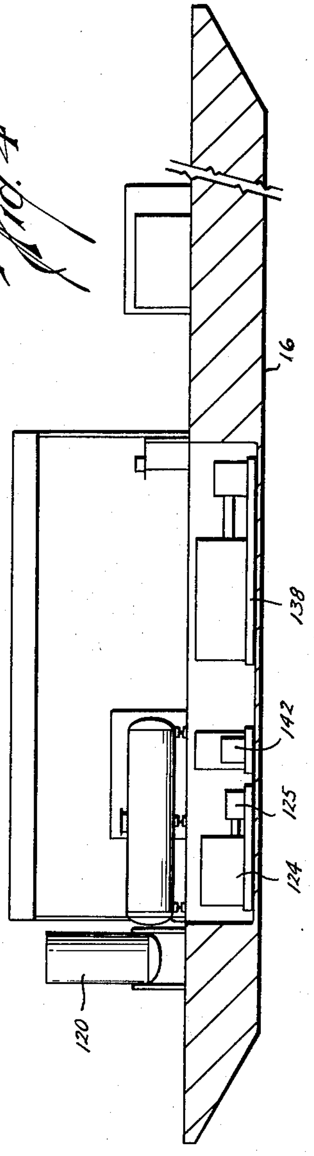
Figures 5, 6, 7:
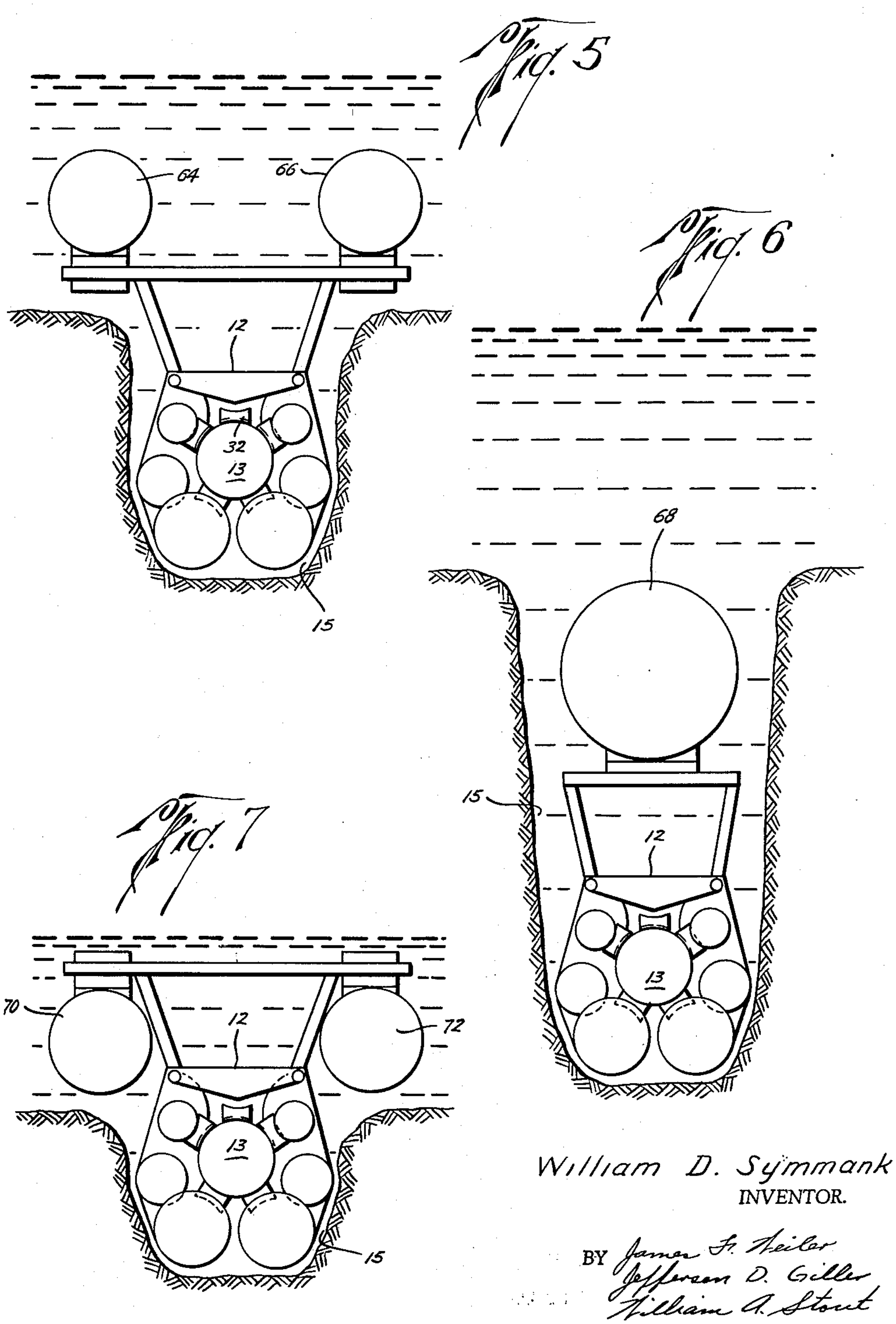
Figure 8:
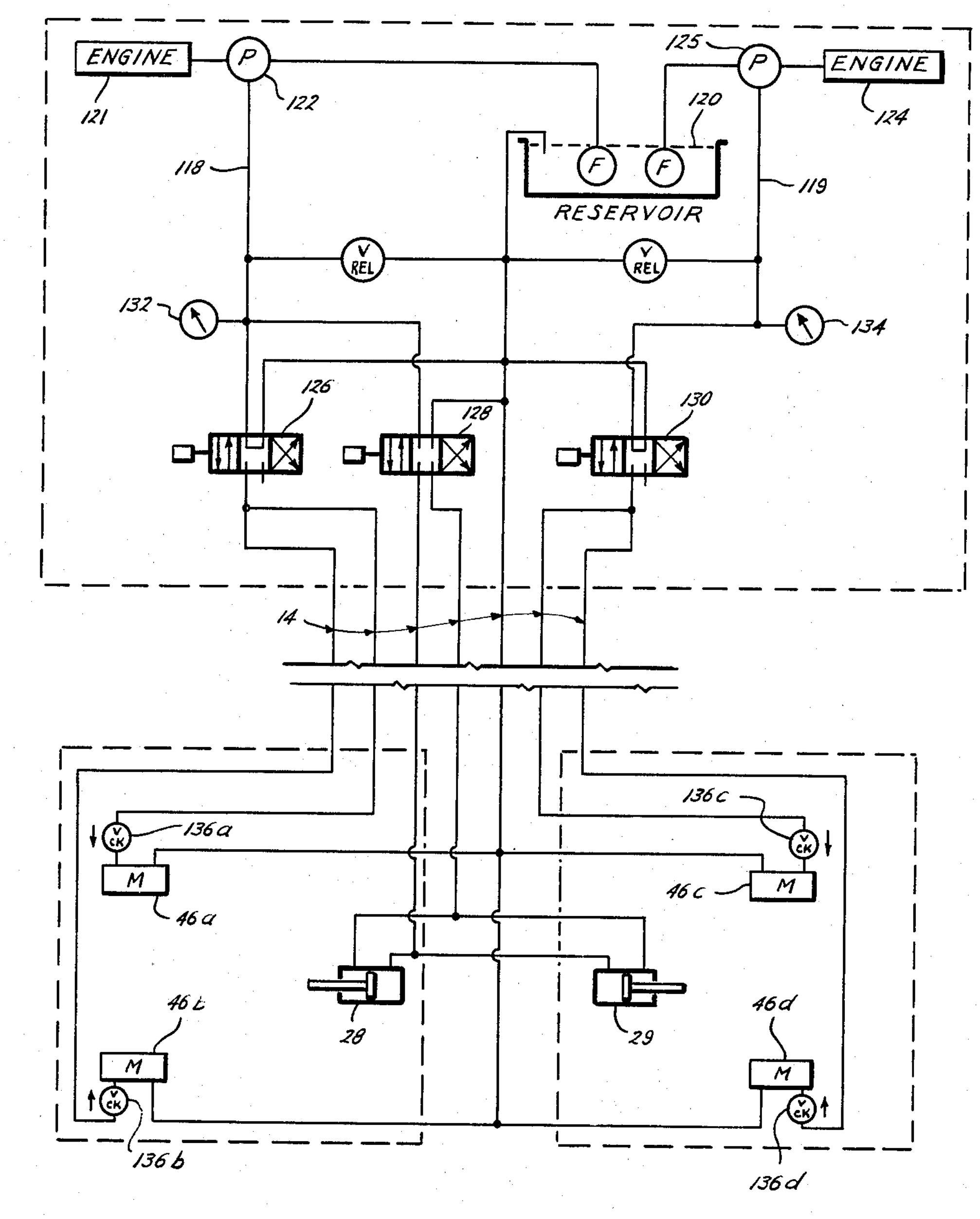
Figure 9:
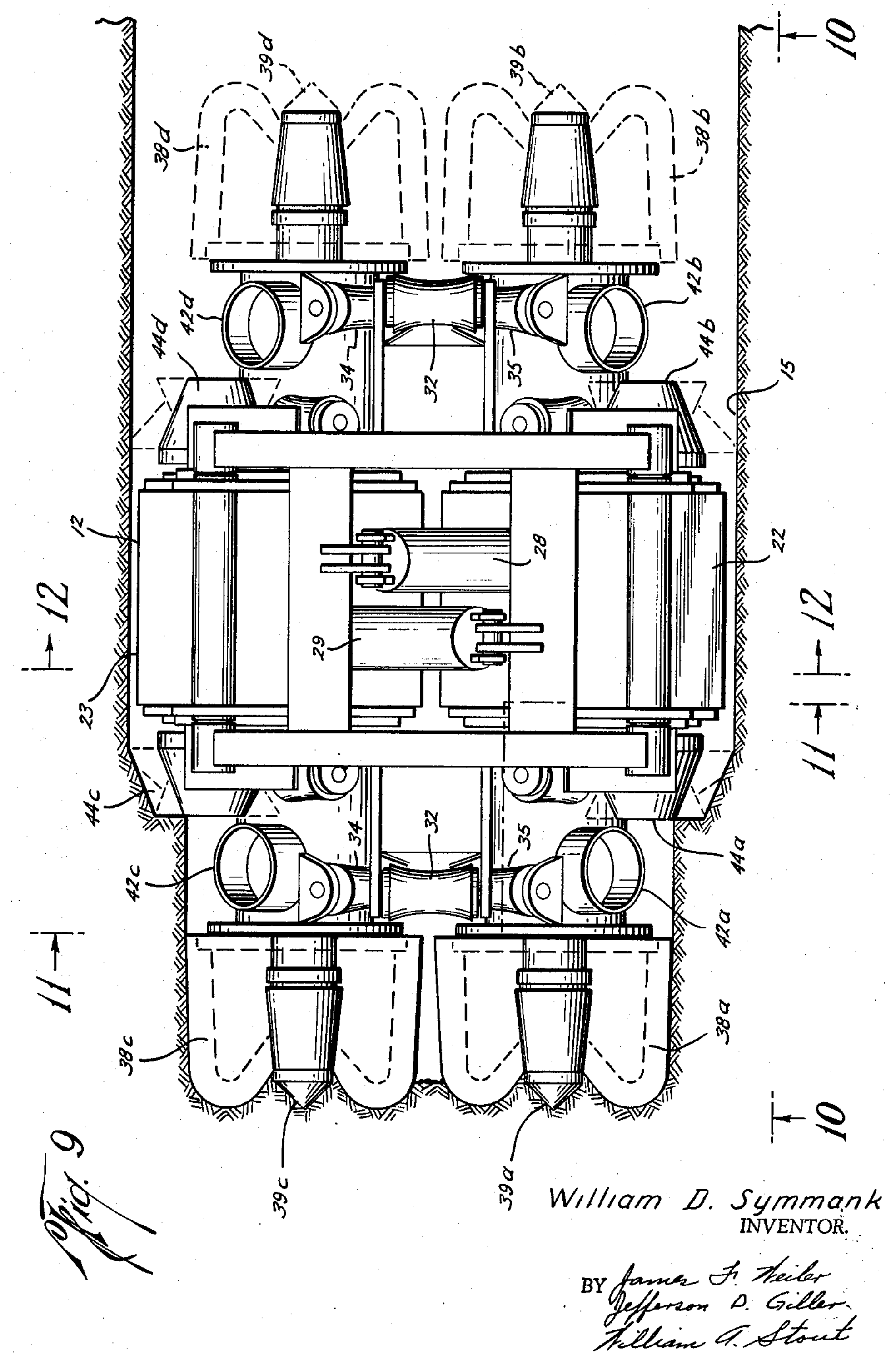
Figure 10:
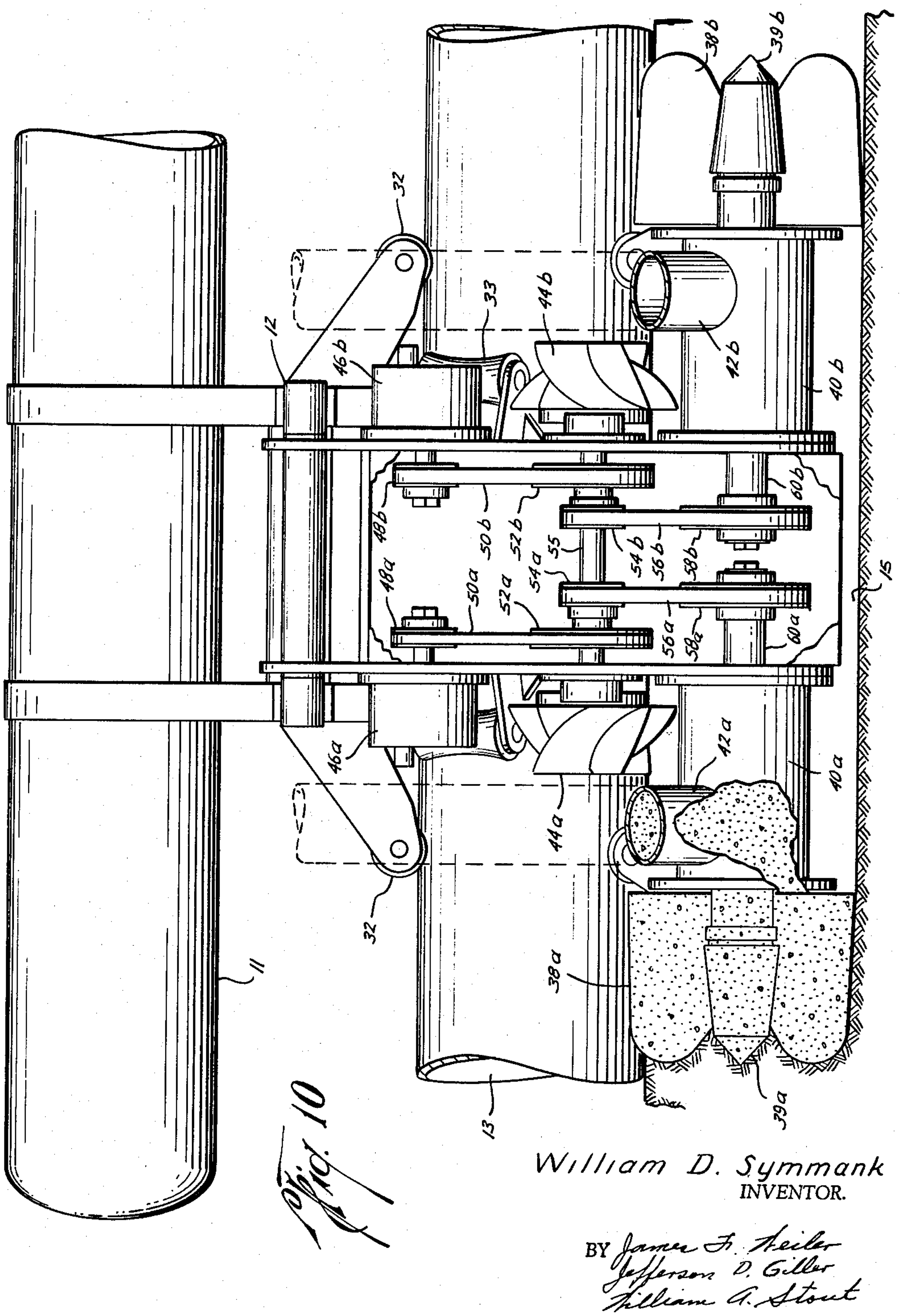

FIGURE 3 is a plan view of the mobile barge of FIGURE 1 and its controls for operating the trencher, FIGURE 4 is an elevational view, partly in section, of an operational barge containing the controls for the pipe line trencher of the present invention, FIGURE 5 is an end view diagrammatically illustrating a trencher and buoyancy structure of the invention for excavating shallow trenches, FIGURE 6 is an end view diagrammatically illustrating a modification showing a buoyancy structure for excavating deep trenches, FIGURE 7 is an end view similar to that of FIGURE 5 illustrating a modification for excavating trenches in shallow water, FIGURE 8 is a schematic diagram of a presently-preferred hydraulic power system and controls of the present invention, FIGURE 9 is a plan view illustrating a submarine pipe line trencher according to the invention, FIGURE 10 is a side view, with parts broken away, taken along the line 10—10 of FIGURE 9.

Figure 11:
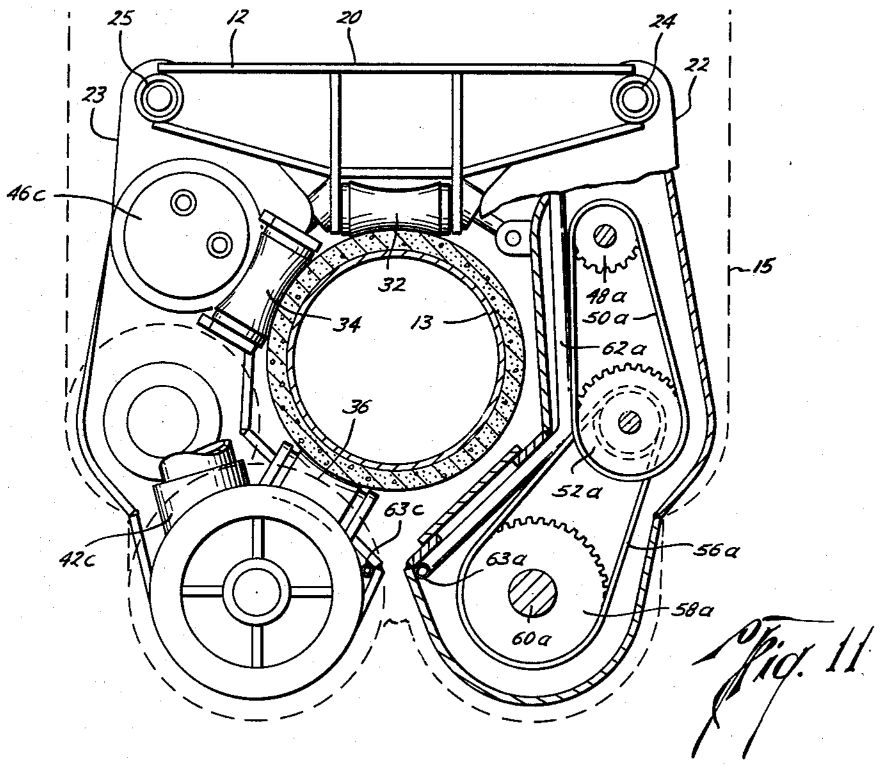
Figure 12:
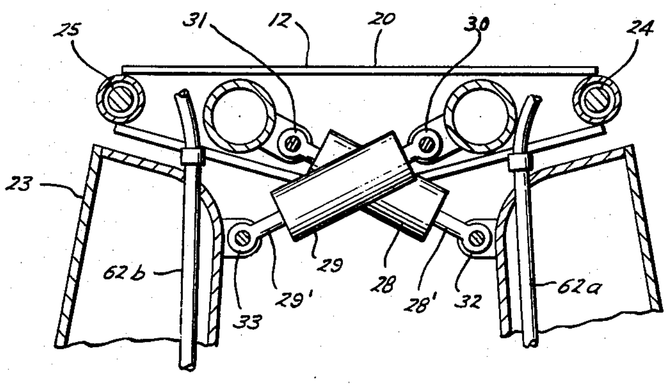
Figures 13, 14:
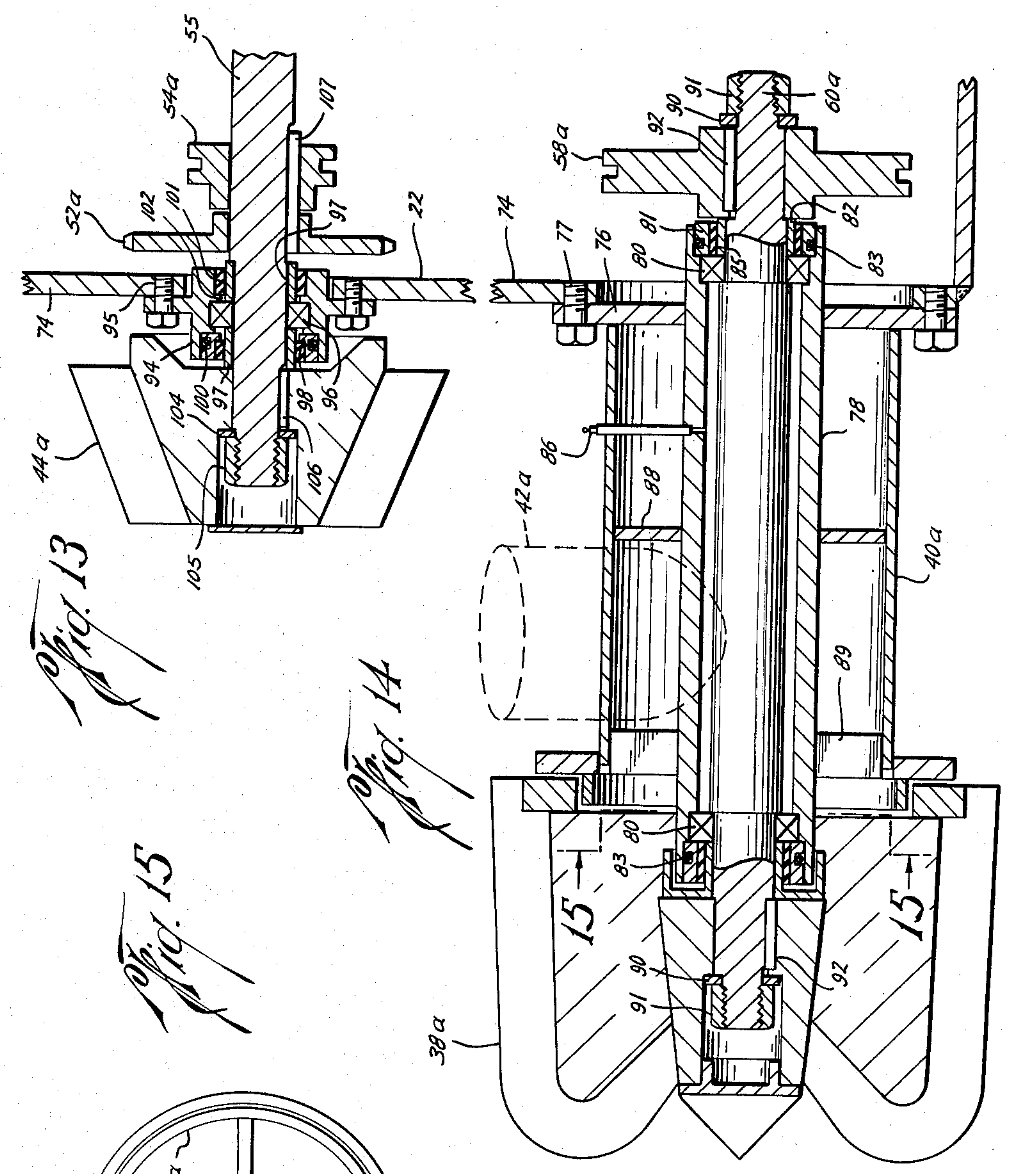
Figure 15:
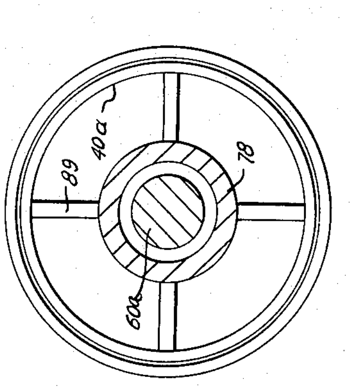
Figures 16, 17:
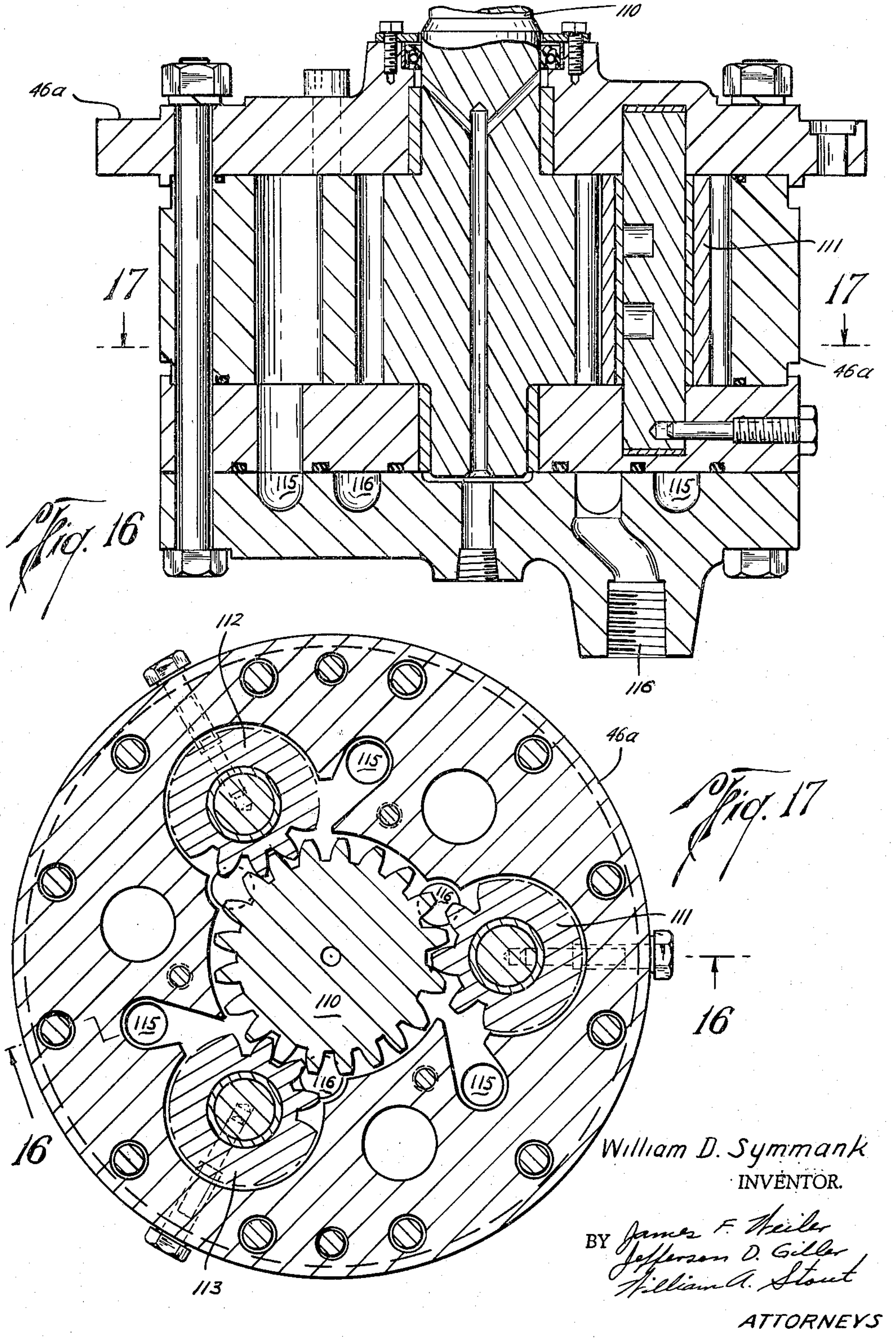
Figure 18:
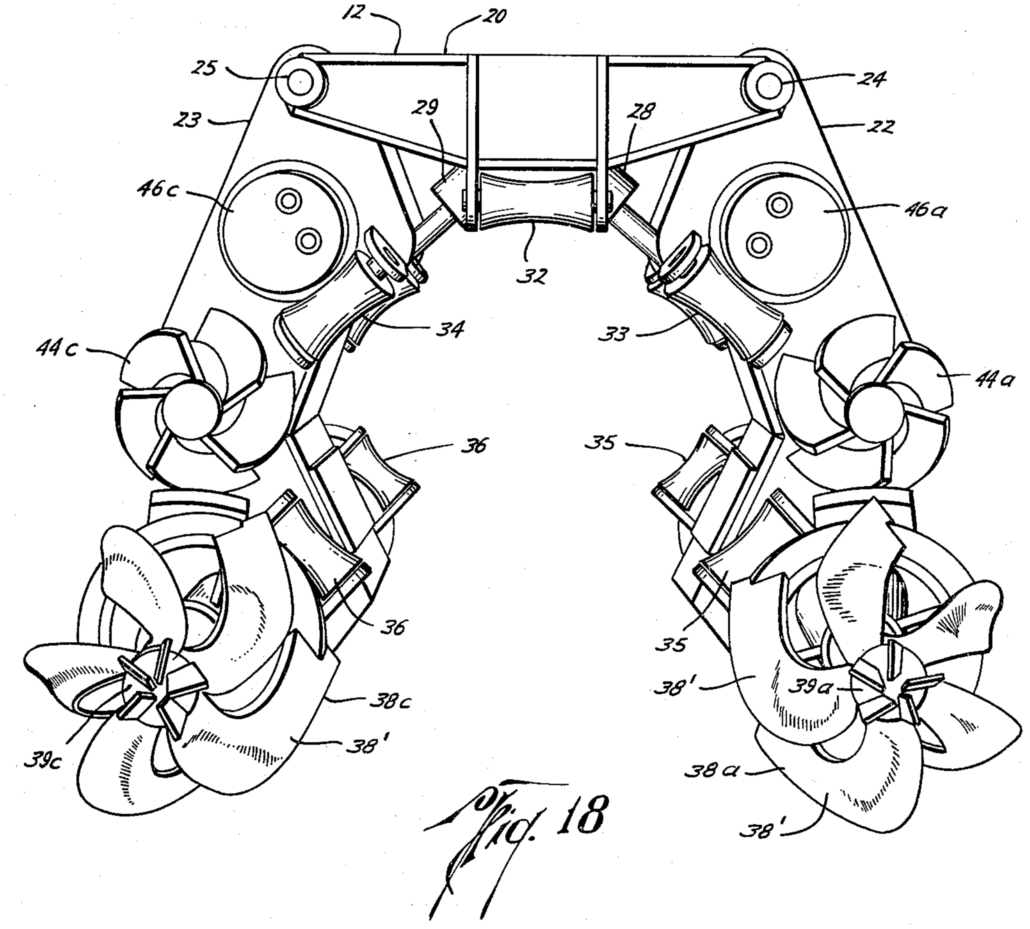
Figure 19:
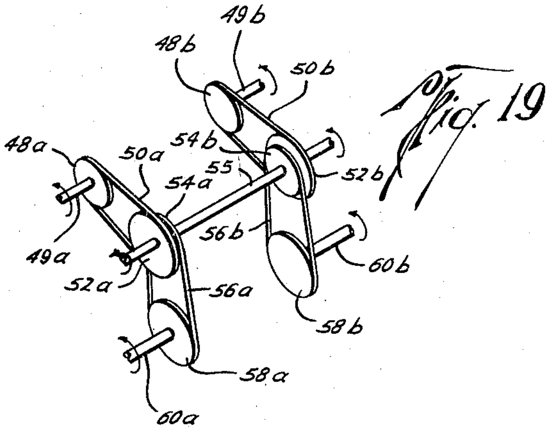

FIGURE 11 is a view, partly in section, taken along the line 11—11 of FIGURE 9,

FIGURE 12 is a fragmentary view taken along the line 12—12 of FIGURE 9 illustrating the connections between the pincer arms and the superstructure, FIGURE 13 is a side sectional view illustrating details of a presently-preferred trench widening cutter shaft assembly, FIGURE 14 is a side sectional view illustrating details of a presently-preferred rotary trench cutter shaft assembly, FIGURE 15 is a view taken along the lines 15—15 of FIGURE 14, FIGURE 16 is a cross-sectional view illustrating details of a presently-preferred hydraulic motor, FIGURE 17 is a view taken along the line 17—17 of FIGURE 16, FIGURE 18 is a perspective front view illustrating a pipe line trencher according to the present invention and FIGURE 19 is a schematic view of a cutter drive assembly.

Referring now to the drawings, and particularly to FIGURES 1 and 2, the reference numeral 10 generally designates the submarine pipe line trencher of the present invention and includes the trencher 12 which rides along the pipe line 13 and is stabilized and supported by the buoyancy members 11, and includes the flexible control hoses 14, 140 and 144 which extend upwardly to a control surface vessel which may be of the winch-barge type 16 (FIGURE 1) or of the barge 17 and tug 18 type (FIGURE 2). As will be explained more in detail later, the barge 16 or tug 18 pull the trencher 12 along the pipe 13.

The trencher 12 which is moved along the pipe line 13 is the component which actually excavates the trench 15 beneath the pipe line 13 and is best seen in FIGURES 9, 10, 11, 12 and 18. Referring now to FIGURE 18, the trencher 12 includes a horizontal support or cross-member 20 and a pair of guide arms or pincer arms 22 and 23, each of which is pivotally connected at one end to an end of superstructure 20 by means of pivots or shafts 24 and 25, respectively, so that the trencher 12 may be placed about the pipe 13, not shown in this view. Hydraulic cylinders 28 and 29 (FIGURES 9, 12 and 18), are provided to swing the pincer arms 22 and 23 outwardly and inwardly and are pivotally connected between cross members of the superstructure 20 by the pivot type connections generally indicated as 30 and 31 (FIGURE 12), respectively. Slidable piston rods 28' and 29' in the cylinders 28 and 29, respectively, are connected to one of the pincer arms 22 and 23 by the pivot connections 32 and 33, respectively. Thus the cylinders 28 and 29 are pivotally connected to cross members of the super structure 20 by the pivot connections 30 and 31 and the piston rods 28' and 29' are pivotally connected to the pincer-type arms 22 and 23 to prevent binding of the pistons, not shown, in the cylinders 28 and 29 during their stroke. Thus, as the pistons in the cylinders 28 and 29 are actuated first in one direction and then in the other by the control means which will be hereinafter described, the relative movement between the pistons and piston rods 28' and 29' and the cylinders 28 and 29, respectively, swing the pincer arms 22 and 23, respectively, to and away from each other thus opening and closing them so that the trencher may be positioned about and locked about the pipe line 13 or removed therefrom. While the hydraulic means are particularly advantageous to open and close the pincer arms 22 and 23, other means may be employed for this purpose.

Roller pairs 32 are provided on the upper body or cross-member 20 and roller pairs 33, 34, 35 and 36 are provided on the pincer arms 22 and 23, preferably near the extremities of the arms 22 and 23. These rollers guide and support the trencher 12 as it is moved along pipe line 13. Thus, the trencher 12 easily follows and rolls along the contour of the pipe line 13. Preferably, these rollers are provided with a rubber or similar exterior so that they will not damage the coating on the pipe line 13.

The trencher 12 is provided with rotary mechanical cutters **38*a*, 38*b*, 38*c* and 38*d* which preferably are attached to each side of the free end of each pincer arm 22 and 23. The shape of these cutters is best seen in FIGURE 18 and it is noted that the cutters have generally arcuate blades 38' which tend to dig down into the bottom of the trench and to throw the cuttings back. A smaller rotary cutter head 39*a*, 39*b*, 39*c* and 39*d* is provided at the forward or outer end portion of each of the cutters 38*a*, 38*b*, 38*c* and 38*d*, respectively, to cut an initial or smaller trench which is greatly enlarged by the blades 38'. Of course, other shapes and types of cutters may be used than the types here illustrated depending upon the subterranean formations and conditions encountered. It is noted, however, that the rotary cutters 38*a*, 38*b*, 38*c* and 38*d* and heads 39*a*, 39*b*, 39*c* and 39*d* provide a positive mechanical means of cutting the formation and are much more effective in more compact soil structure where other types of cutting apparatus are not satisfactory. It is also noted that the trench cutters 38*a*, 38*b*, 38*c* and 38*d* and heads 39*a*, 39*b*, 39*c* and 39*d* are provided on both sides of the trencher 12 and dig a trench in either direction beneath the pipe 13 depending on which way the trencher 12** is towed.

Located behind each rotary trench cutter **38*a*, 38*b*, 38*c* and 38*d* as best seen in FIGURES 9 and 10, is a cutting collector housing 40*a*, 40*b*, 40*c* and 40*d*, respectively, into which the cuttings from the trench 15 are collected for removal from the trench. A suction line connector 42*a*, 42*b*, 42*c* and 42*d* is provided on each of the dredge suction collectors 40*a*, 40*b*, 40*c* and 40*d*, respectively, for attachment to a suction line which will be more fully described hereinafter so that the excavated material is completely removed and discharged away from the trench 15 and is thereby prevented from falling back into the trench or settling out into the trench behind the trencher 12 before the pipe 13, which is usually suspended some distance behind the trencher 12, has had a chance to settle into the ditch 15**.

As best seen in FIGURES 9, 10 and 18, what might be termed trench widening cutters **44*a*, 44*b*, 44*c* and 44*d* are connected to the pincer arms 22 and 23 above and outside the ditch cutters 38*a*, 38*b*, 38*c* and 38*d*. The cutters 44*a*, 44*b*, 44*c* and 44*d* serve to widen the sides of the trench above the ditch cutters 38*a*, 38*b*, 38*c* and 38*d* thereby permitting the pipe 13 to be more easily laid in the trench 15 and preventing the trencher 12 from becoming stuck or bound in the trench 15. The cutters 44*a*, 44*b*, 44*c* and 44*d*** are here shown as being rotary blade type cutters and may be of various shapes and designs depending upon the soil formation and conditions encountered.

As best seen in FIGURES 10, 11 and 18, hydraulic motors **46*a*, 46*b*, 46*c* and 46*d* are provided on the arms 22 and 23, respectively to rotate and operate the ditch or trench cutters 38*a*, 38*b*, 38*c* and 38*d* and the trench widening cutters 44*a*, 44*b*, 44*c* and 44*d***. These fluid or hydraulic motors are highly advantageous, although, if desired, other type motors may be used, for example, electric motors suitably enclosed to prevent water from getting into the motors.

A typical drive arrangement between the motors and the cutters, here shown with reference to the drive arrangement for the arm 22, may best be seen by referring to FIGURES 10, 11 and 19. As shown, the drive train from the hydraulic motors **46*a* and 46*b* to the cutter shaft assemblies is made up of chains and sprockets. The sprockets 48*a* and 48*b* are connected to the shafts 49*a* and 49*b* of the hydraulic motors 46*a* and 46*b*, respectively. The drive speed is reduced to the sprockets 52*a* and 52*b* through the drive chains 50*a* and 50*b*, respectively, from the drive sprockets 48*a* and 48*b*, respectively. Thus the common shaft 55 of the trench widening cutters 44*a* and 44*b* which is connected to sprockets 52*a* and 52*b* is rotated. The drive to the trench cutters 38*a* and 38*b* is taken off the trench widening cutter shaft 55 by means of another chain reduction from the sprockets 54*a* and 54*b*, respectively, through the chains 56*a* and 56*b*, respectively and to the sprockets 58*a* and 58*b*, respectively, which are connected to the trench cutter shafts 60 and 60*b*, respectively. This arrangement is advantageous as it is simple, provides the desired gear reduction for greater torque and accommodates the movement of the pincer arms 22 and 23 when placing the trencher 10 about the pipe line 13** or removing it therefrom. Of course, various other types of cutter drives may be provided, if desired.

As best seen in FIGURE 19, the drive train of arm 22 is rotated in the direction indicated so that the cutters **44*a* and 38*a* are rotated in a counterclockwise direction and the cutters 44*b* and 38*b* are rotated in a clockwise direction. The drive assembly for the cutters 44*c* and 44*d* and 38*c* and 38*d* which are located on arm 23 is the same as the drive assembly shown for the arm 22 with the exception that the cutters are rotated in the opposite direction to the corresponding cutters on arm 22**. Since the cutters facing the unexcavated material are rotating in opposite directions the crawling action or torsional movement about the axis of the pipe line is minimized.

The arm members 22 and 23 advantageously form a protective housing around the cutter drive mechanisms and protect them from any interference from debris or cuttings or the like. Preferably, the inside of the arm members 22 and 23 are filled with lubricating oil and are sealed watertight thereby causing all the drive sprockets and chains which are enclosed therein to operate in oil.

As best seen in FIGURES 11 and 12, a high pressure manifold jet line **62*a* and 62*b* is located on the inside of each pincer arm 22 and 23, respectively, and extends to a position near each dredge cutter 38*a*, 38*b*, 38*c* and 38*d*. As shown in FIGURE 11, the jet nozzles 63*a* and 63*b* are connected to jet manifold 62*a* and jet nozzles 63*c* and 63*d* are connected to the jet manifold 62*b*. Water under high pressure is jetted through the nozzles 63*a*, 63*b*, 63*c* and 63*d* by means of a high pressure water pump which will be further described hereinafter and which delivers water under pressure for jetting the loose formations thereby supplementing the cutting action of the dredge cutters 38*a*, 38*b*, 38*c* and 38*d*, and cleaning the trench 15 of loose cuttings as well as cleaning the trench cutters 38*a*, 38*b*, 38*c* and 38*d*. Other jetting arrangements may be provided as desired depending particularly on the soil conditions encountered. For instance, it may be especially desirable in loose formations to wash out in front of the pincer arms 22 and 23 where the pipe 13** sinks below grade due to the weight of the pipe behind the trencher.

Referring now to FIGURES 5, 6, 7 and 10, various types of buoyancy members or pontoons may be provided to stabilize and support the pipe trencher 12 as it is moved along the pipe line 13. FIGURE 5 shows a presently-preferred buoyancy arrangement used in the excavation of a shallow trench utilizing two buoyancy members 64 and 66 which are suitably interconnected and suitably connected to the superstructure 12 of the pipe line trencher. These buoyancy members 64 and 66 tend to stabilize the trencher 12 when it is in operation and to prevent it from crawling around the pipe and thus maintain the trencher 12 in a vertical position. The buoyancy members also support the trencher 12 and thus prevent the entire weight of the trenching machine 12 from being supported on the pipe 13 by the guide rollers 32 thereby damaging the pipe coating.

FIGURE 6 illustrates a buoyancy arrangement which is particularly advantageous in drilling deep trenches and is provided with a single buoyancy member 68 which is suitably connected to the trencher 12 and is of a size and is so positioned so that it can enter into the trench 15 and thus will not catch upon the banks of the trench and prevent the trencher 12 from ditching down in a deep trench.

FIGURE 7 illustrates a buoyancy arrangement for excavating a trench in shallow water. The structure may be provided with buoyance members 70 and 72 suitably interconnected at their tops and to the trencher 15 so that the chambers 70 and 72 are vertically positioned as near as possible to the trencher 12 without interfering with its work and thereby provide sufficient buoyancy even in shallow waters. Of course, other types of buoyancy or mechanical arrangements may be used to maintain the trencher in an upright position such as skids or a track type carrier, particularly when the trencher is used in a marsh or swampy location.

Referring now to FIGURE 14, the details of a representative trench cutter shaft assembly may be seen. This cutter shaft assembly is representative for all the trench cutters **38*a*, 38*b*, 38*c* and 38*d*, and is here shown as the trench cutter 38*a* connected in the pincer arm 22 by connection to the side wall 74. A steel plate 76 is suitably connected to the side 74 by the bolts 77 and supports the dredge cutter shaft housing 78 which is in the form of a tube. The cutter shaft 60*a* is rotatably mounted on the dredge cutter shaft housing 78 which is in the form of a tube. The cutter shaft 60*a* is rotatably mounted on the interior of the shaft housing 78 by means of suitable bearings at each end such as the roller bearings 80, which are sealed by the bronze bushings 81 and 82, the neoprene ring 83, and a lock closure member 85. A grease pipe connection 86 is provided to the interior of the shaft housing 78 for lubricating the roller bearings 80. The dredge cutter collector housing 40*a* is connected to the plate 76 and is connected to and disposed coaxially about the shaft housing 78 by the plate 88 and the bars 89. The cutter 38*a* at one end and the pulley 58*a* at the other end of the shaft 60*a* are secured to the shaft by means of a conventional keyway 92, washer 90 and threaded connector 91**.

Referring now to FIGURE 13, a typical trench widening cutter assembly may be seen, here shown as the cutter **44*a*. The trench widening cutter housing 94 is secured to the side wall 74 of the pincer arm 22 by any suitable means such as the bolts 95. The cutter shaft 55 extends through the housing 94 and rotates on a roller bearing 96 which is sealed on each side by the bronze bushings 97 and 98, the neoprene rings 100, a closure lock 101, and the steel ring 102. The cutter 44*a* is secured to the shaft 55 by means of a conventional key 106, washer 104 and lock connector 105. The pulleys 52*a* and 54*a* are secured to the shaft 55 by means of a conventional keyway 107**.

Of course, if desired, any suitable arrangement may be utilized to rotatably mount the cutters **38*a*, 38*b*, 38*c* and 38*d* and 44*a*, 44*b*, 44*c* and 44*d* in the pincer arms 22 and 23** so that rotation is imparted from the drive arrangement previously described.

Referring now to FIGURES 16 and 17, the details of construction of the hydraulic motors **46*a*, 46*b*, 46*c* and 46*d* may be seen, here shown as the motor 46*a*. The drive shaft 110 is driven by three fluid rotor assemblies 111, 112 and 113. The hydraulic fluid enters through the inlets 115, rotates the rotor assemblies 111, 112 and 113, and returns through the outlets 116**. No further detail thereof is deemed necessary as other types of motors may be used and a hydraulic motor of the type illustrated is manufactured by the SICAM Company of Lyon, France and has been found to be satisfactory.

The prime movers of the submerged trenching mechanism 12 and its controls are located on surface vessels and include a portion of the hydraulic system, a dredge suction pump, a jet pressure pump, and a towing mechanism. Referring now to FIGURE 8, a schematic view of the hydraulic system is shown. The hydraulic system actuates the hydraulic motors **46*a*, 46*b*, 46*c* and 46*d* and actuates the hydraulic positioning cylinders 28 and 29 which control the position of the pincer or guide arms 22 and 23, respectively. The hydraulic system, in general, preferably consists of two independent power transmission systems 118 and 119 having one common oil or hydraulic liquid reservoir 120 and one common return line 121. Each of the power systems includes an internal combustion engine with variable governor control to regulate the output r.p.m. driving a fixed displacement pump. The engine 121 drives the pump 122 in the transmission system 118 and the engine 124 drives the pump 125 in the transmission system 119. The transmission system 118 provides the power and controls for the hydraulic motors 46a and 46b and for the double acting arm positioning cylinders 28 and 29. The transmission system 119 provides the power and control for activating the hydraulic motors 46c and 46d. Thus the hydraulic system controls the movement of the pincer arms 22 and 23 and of all the rotary cutters. Four-way, three-position, open center control valves 126, 128 and 130 are provided in the transmission systems. Static pressure check valves 136a, 136b, 136c and 136d are provided to each motor inlet port of the hydraulic motors, 46a, 46b, 46c and 46d, respectively, to protect the system from possible contamination in case of pressure line rupture. All of the hydraulic motor return lines are manifolded into one common return line 121 direct to the reservoir 120. It is noted that the arm positioning cylinders 28 and 29 are actuated by the valve 128 separately from the motor controls so that the arms 22 and 23 may be opened or closed with or without the cutters being in operation. The pressure fluid from the prime movers and controls on the surface vessel are transmitted from the control valves to each of the hydraulic motors and cylinders by means of the flexible hoses 14**.

A physical layout of the hydraulic system may easily be seen on the typical barge-winch 16 as seen in FIGURES 3 and 4. There the engines 121 and 124 and their pumps 122 and 125, respectively, are suitably located and interconnected with the trenching machine 12 by means of the flexible hoses 14.

Also located on the barge 16 is the dredge suction pump and engine unit 138 which removes the excavated material from the pipe line trench by means of one common suction line 140 that is manifolded to the four suction outlets 42a, 42b, 42c and 42d which are in turn attached to the collector trap housings 40a, 40b, 40c and 40d, respectively, behind each of the dredge cutters 38a, 38b, 38c and 38d. Also located upon the vessel 16 is a jet engine pump unit 142 which provides the jet or high pressure water pump for jetting loose formations and cleaning the trench cutters and which delivers water under pressure through a high pressure flexible hose 144 through the jet manifolds 62a and 62b and to the jet nozzles 63a, 63b, 63c and 63d (FIGURES 11 and 12).

Thus, advantageously the actuation of the trencher is controlled hydraulically from the surface and provides effective drive means for the various elements of the trencher.

The winches used for towing the trenching mechanism 12 are motivated preferably by an internal combustion engine and have a uniform cable give and take system of towing the trencher 12 in either direction along the pipe line. One such apparatus for towing the trencher 12 is shown in FIGURES 1 and 3 by the use of the winch-barge 16. Three-drum hoists 146 and 148 are provided for the anchor and handling winches. A two-drum hoist 150 is provided for the propelling winch for moving the trencher 12 along the pipe line in either direction by means of the pulleys 151 and 152 on the vessel 16 and with the pulleys 153 and 154 which are secured to the pipe line 13.

FIGURE 2 illustrates a barge-tug method of operation whereby the tug 18 is used to pull the control and power barge 17 along as well as to propel the trencher 12 along the pipe 13.

Obviously, any desired means may be used to tow or move the trencher 10 along the pipe line 13.

In use, the trenching machine 12 is carried to the desired location by means of a suitable supporting structure 152 attached to the accompanying power and control barge 16 or 17 where the pipe 13 has been coated and positioned on the floor in conventional manner. The trenching machine 12 is lowered into position over the pipe line 13 by means of the winch 148 and the crane 152. Suitable buoyancy chambers such as illustrated in FIGURES 5, 6 and 7 may be utilized by buoyancy controls (not shown) depending upon the water depth and the depth of the trench to be dug so as to control the downward force and to stabilize the trenching mechanism 12 in an upright operating position. After the trenching mechanism 12 has been lowered into position over the pipe 13, the hydraulic cylinders 28 and 29 are operated to move the guide or pincer arms 22 and 23 into the open position (FIGURE 18) and the trencher 12 is lowered onto the pipe 13, and the hydraulic cylinders 28 and 29 are again actuated to close the pincer arms so that all the guide rollers 32, 33, 34, 35 and 36 ride on the pipe coating and guide and support the trencher 12 along and about the pipe and protect the pipe coating (FIGURES 9, 11 and 10).

The hydraulic motors 46a, 46b, 46c and 46d are then activated so that the trench cutters 38a, 38b, 38c and 38d and the side wall cutters 44a, 44b, 44c and 44d are actuated. It may be necessary to start the trench cutters before the pincer arms 22 and 23 have been closed in order that the trencher 12 may dig its way into position so that the arms 22 and 23 can be in position to enclose and lock about the pipe 13. The trencher 12 is then moved along the pipe by any desirable means such as the winch 150 on the barge 16 (FIGURE 1) or the tug boat 18 (FIGURE 2) and the cutters excavate a trench along and under the pipe 13. The loose debris in the hole and the cuttings from the dredge cutters 38a, 38b, 38c and 38d along with the cuttings from the cutters 44a, 44b, 44c and 44d, which may fall to the bottom of the trench, are directed into or sucked into the collector housings 40a, 40b, 40c and 40d and are removed from the trench 15 through the suction line 140 by the dredge suction engine and pump unit 138 on the barge and are discharged from the barge 16 by the discharge line 141 away from the trench 15.

If desired, the high pressure water jets 63a, 63b, 63c and 63d (FIGURE 11) may be utilized by the operation of the jet engine pump unit 142 on the barge (FIGURE 3) which sucks water into the suction line 143 and discharges the water through the hose 144 to the trencher 12. The high pressure jetting through the nozzles jets the loose formation, aids in cleaning the trench, and helps to keep the trench cutters 38a, 38b, 38c and 38d clean.

After a cutting pass has been made along and under the pipe 13 digging a trench 15, the pipe 13 settles into this trench. If the trench is not sufficiently deep the trencher 12 is towed or winched in the opposite direction and another cutting pass is taken thereby deepening the trench. It is noted that the trencher 12 is identical on both sides and to make a cutting pass the direction of towing or winching is merely reversed.

It is to be noted that the trencher 12 can advantageously be attached to and released anywhere along the pipe line, not merely at one end, and can dig its way down around and under a pipe line, and in the event of a cave-in, can dig its way up and out of the trench. Furthemore, the trencher 12 advantageously disposes of the excavated material away from the ditch so that the excavated material does not fall back in or settle back into the ditch before the pipe line 13 has had an opportunity, which depends upon its rigidity, to settle into the trench. The movement of the cuttings or excavated materials away from the trench is important, especially in the ditching of deep trenches. Also, the use of the mechanical cutters provides a trencher which will cut away the material in compact formations and has no depth limitations such as in conventional jetting methods. However, the jets may be used to complement the rotary mechanical cutters and aid in cutting and cleaning the hole and in cleaning the cutters.

It is also noted that there is no rigid connection between the trencher 12 and the barge and therefore the present apparatus can be used advantageously in rougher waters than types of apparatus having rigid connections to the surface. It is also noted that the trencher 12 follows the pipe line contour readily and easily, does not damage the pipe coating, and prepares a trench accurately with reference to the pipe line location.

It is believed that the method of the invention is apparent from the foregoing description of a presently preferred apparatus of the invention. The method, however, comprises the steps of moving a rotary mechanical cutter along and beneath a pipe line and removal of the excavated material from the trench by suction or by pressure jets. The method also comprehends moving a mechanical rotary cutter along and beneath a pipe line, removal of the excavated material from the trench by suction, and cleansing of the rotary cutters by pressure jet cleansing. The method further comprehends the movement of the rotary cutters first in one direction and then in the other along the pipe line thereby providing the necessary trench depth.

The present invention, therefore, is well suited to carry out the objects and attain the ends and advantages mentioned as well as others inherent therein. While presently preferred embodiments of the invention are given for the purpose of disclosure, numerous changes in the details of construction, arrangement of parts and steps of the process may be made which will readily suggest themselves to those skilled in the art which are encompassed within the spirit of the invention and the scope of the appended claims.

What is claimed is:

1. A pipe line trencher for excavating a trench to hold pipe comprising a cross-member, two pincer arms, each of said pincer arms pivotally connected to the cross-member, means connected between the cross-member and each pincer arm for moving said arms toward and away from each other thereby securing said trencher to the pipe when the trencher is placed about the pipe and the pincer arms closed on the pipe, roller means connected to each of said pincer arms, at least one rotary cutter connected to each pincer arm, motor means operatively connected to said cutters for rotating said cutters, and means for moving said trencher along the pipe.

2. The trencher of claim 1 including suction means attached adjacent said rotary cutters for removing the cuttings of the cutters from the trench.

3. The trencher of claim 1 including buoyancy means attached to said trencher for stabilizing and supporting the trencher, said buoyancy means having a width less than the width of the trench being excavated thereby preventing the buoyancy means from obstructing the excavation of a deep trench.

4. The trencher of claim 1 including high pressure jet means attached to said pincer arm and arranged for digging and cleaning said trench and cutters.

5. The trencher of claim 2 including high pressure jet means attached to said pincer arms for cutting and cleaning said trench.

6. The trencher of claim 2 including buoyancy members attached to said cross-member thereby stabilizing and supporting the cross-member.

7. The trencher of claim 2 including high pressure jet means attached to said pincer arms for cutting and cleaning said trench and including buoyancy members attached to said cross-member for stabilizing and supporting said trencher.

8. The trencher of claim 4 including buoyancy members attached to said cross-member thereby stabilizing and supporting said trencher.

9. A pipe line trencher for excavating a trench beneath a pipe comprising a superstructure, two pincer guide arms, said pincer guide arms pivotally connected to opposite ends of the superstructure, means connected to the superstructure and the pincer arms for moving the pincer arms toward and away from each other, a rotary trench cutter connected to each of the pincer arms, a trench widening cutter connected to each of said pincer arms, motor means operatively connected to and driving said cutters, at least one support roller attached to each pincer arm thereby rollingly supporting said trencher on the pipe, said support rollers having a concave external surface thereby gripping and securing the trencher to the pipe when the pincer arms are closed on the pipe, suction means adjacent said trench cutters for removing the cuttings of said trench cutters, and means for moving said trencher along said pipe.

10. The trencher of claim 9 including high pressure jet means disposed adjacent said trench cutters for cutting and cleaning the trench.

11. The trencher of claim 9 including buoyancy members attached to the trencher thereby stabilizing and supporting said trencher.

12. The invention of claim 10 including buoyancy means attached to said trencher to stabilize and support the trencher.

13. A submarine pipe line trencher for excavating a trench beneath a pipe line comprising a generally-horizontal superstructure, two pincer arms, one end of each of said pincer arms pivotally connected to opposite sides of the superstructure, a hydraulic piston and cylinder assembly pivotally connected between the superstructure and each pincer arm arranged to pivot the pincer arms, said pincer arms adapted and constructed so as to enclose said pipe when the trencher is placed around the pipe and the pincer arms are closed, a rotary trench cutter connected adjacent the free end of each pincer arm, motor means attached to said cutters, a cutting collector housing behind each of the trench cutters arranged to receive cuttings from the cutters, a suction line connected to each cutting housing thereby removing the cuttings from the housing and the trench, guide support rollers attached to the superstructure and to the pincer arms rollingly supporting the trencher as it is moved along the pipe, buoyancy members attached to the trencher thereby stabilizing and supporting said trencher, and towing means attached to the trencher for moving the trencher along the pipe.

14. The trencher of claim 13 including a rotary trench widening cutter connected to each pincer arm, and including means to rotate said widening cutters.

15. The trencher of claim 14 including high pressure jet means disposed adjacent the rotary trench cutters providing cutting and cleaning action of the trench and rotary cutters.

16. A submarine pipe line trencher for excavating a trench beneath a pipe line, comprising a horizontal superstructure, two guide arms, one each pivotally connected adjacent each end of the superstructure, a hydraulic piston and cylinder assembly pivotally connected between the superstructure and each guide arm and constructed and arranged to move the guide arms toward and retract them from each other, a rotatable trench cutter connected on each side of each guide arm near the ends thereof, a rotatable trench widening cutter connected on each side of each guide arm, a hydraulic motor disposed on each guide arm, drive means connecting the motor to the cutters, a cutting collector housing disposed in each guide arm arranged to receive cuttings from the trench, guide support rollers attached to the upper superstructure and adjacent the free end of each guide arm thereby rollingly securing the trencher to the pipe when the guide arms are closed about the pipe, jet nozzles disposed adjacent each trench cutter for cutting and cleaning the trench, a buoyancy member attached to the superstructure stabilizing and supporting the trencher; a surface vessel, power and control means on said vessel for operating the trencher, flexible control and power hoses connected between the power and control means and the trencher for providing power to the hydraulic piston and cylinder assemblies and to said motor, and towing means attached to the trencher to move the trencher along the pipe.

References Cited in the file of this patent

UNITED STATES PATENTS

| | | |
|---|---|---|
| Re. 23,963 | Collins | Mar. 15, 1955 |
| 1,703,777 | Pernot | Feb. 26, 1929 |
| 2,361,404 | Kalix | Oct. 31, 1944 |
| 2,693,085 | Salnikov | Nov. 2, 1954 |
| 2,705,379 | Fruhling | Apr. 5, 1955 |
| 2,755,632 | Hauber | July 24, 1956 |
| 2,762,136 | Bell | Sept. 11, 1956 |
| 2,765,548 | Glaser | Oct. 9, 1956 |
| 2,879,649 | Elliott | Mar. 31, 1959 |